United States Patent
VanderPol et al.

(10) Patent No.: US 7,270,505 B2
(45) Date of Patent: Sep. 18, 2007

(54) CUTTING AND BEVELING TOOL

(75) Inventors: Jerald W. VanderPol, Shingle Springs, CA (US); Lane L. Larson, Folsom, CA (US)

(73) Assignee: Tri Tool Inc., Rancho Cordova, CA (US)

(*) Notice: Subject to any disclaimer, the term of this patent is extended or adjusted under 35 U.S.C. 154(b) by 311 days.

(21) Appl. No.: 10/876,614

(22) Filed: Jun. 28, 2004

(65) Prior Publication Data

US 2004/0234352 A1   Nov. 25, 2004

Related U.S. Application Data

(63) Continuation-in-part of application No. 10/776,181, filed on Feb. 12, 2004, now Pat. No. 6,966,731.

(60) Provisional application No. 60/450,699, filed on Mar. 3, 2003.

(51) Int. Cl.
*B23C 1/20* (2006.01)
*B23Q 9/02* (2006.01)

(52) U.S. Cl. ............... 409/178; 409/180; 409/138; 409/126; 144/136.95; 105/29.1

(58) Field of Classification Search ........ 409/178–179, 409/180, 138, 182, 125–126, 130; 144/136.95, 144/154.5, 371; 105/29.1, 144
See application file for complete search history.

(56) References Cited

U.S. PATENT DOCUMENTS 2,921,492 A * 1/1960 Worth ...................... 409/178
3,176,587 A * 4/1965 Appleton et al. ............. 409/84
3,456,555 A    7/1969 Dunlap
3,477,341 A * 11/1969 Rickenbrode ............... 409/179
3,603,204 A    9/1971 Anderson
4,297,061 A   10/1981 Wolfe et al.
4,519,169 A    5/1985 Smith
4,570,542 A    2/1986 Cable et al.

(Continued)

FOREIGN PATENT DOCUMENTS

JP    52-71789 A  *  6/1977

OTHER PUBLICATIONS

Machinery's Handbook, 25th ed., 1996, pp. 224-225, 232-245.*
ASM Handbook, vol. 20, Materials Selection and Design, 1997, p. 271.*

*Primary Examiner*—Erica Cadugan
(74) *Attorney, Agent, or Firm*—Bacon & Thomas, PLLC

(57) ABSTRACT

A cutting tool and mounting system includes a tool carrier arranged to be mounted onto a workpiece, a cutting tool assembly carried by the tool carrier, and a tracking assembly connected to the cutting tool assembly and positioned to follow the contour of an outer surface of the workpiece. The cutting tool assembly includes a cutting tool arranged to be rotated about a longitudinal axis and a tool driving system connected to and arranged to transmit rotary input motion to the cutting tool. The cutting tool is secured by the tool driving system to be fed along its axis of rotation and transversely of its axis of rotation for cutting a workpiece through a wall thickness of the workpiece to impart a beveled surface to a severed end portion of the workpiece.

13 Claims, 16 Drawing Sheets

U.S. PATENT DOCUMENTS

| | | |
|---|---|---|
| 4,739,685 A | 4/1988 | Ricci |
| 4,944,205 A | 7/1990 | Ricci |
| 5,044,844 A | 9/1991 | Backhouse |
| 5,189,933 A | 3/1993 | Ricci |
| 5,240,359 A | 8/1993 | Backhouse |
| 5,403,133 A | 4/1995 | Kim |
| 5,549,024 A | 8/1996 | Ricci |
| 5,758,998 A * | 6/1998 | White ........................ 409/180 |
| 6,025,569 A | 2/2000 | McCardle et al. |
| 6,146,067 A | 11/2000 | Owens |
| 6,244,189 B1 | 6/2001 | Kingsley |
| 6,476,339 B2 | 11/2002 | Easterday |
| 6,494,307 B1 | 12/2002 | Kozak et al. |
| 6,966,731 B2 * | 11/2005 | VanderPol et al. .......... 409/179 |
| 2004/0234352 A1 * | 11/2004 | Vanderpol et al. .......... 409/178 |

* cited by examiner

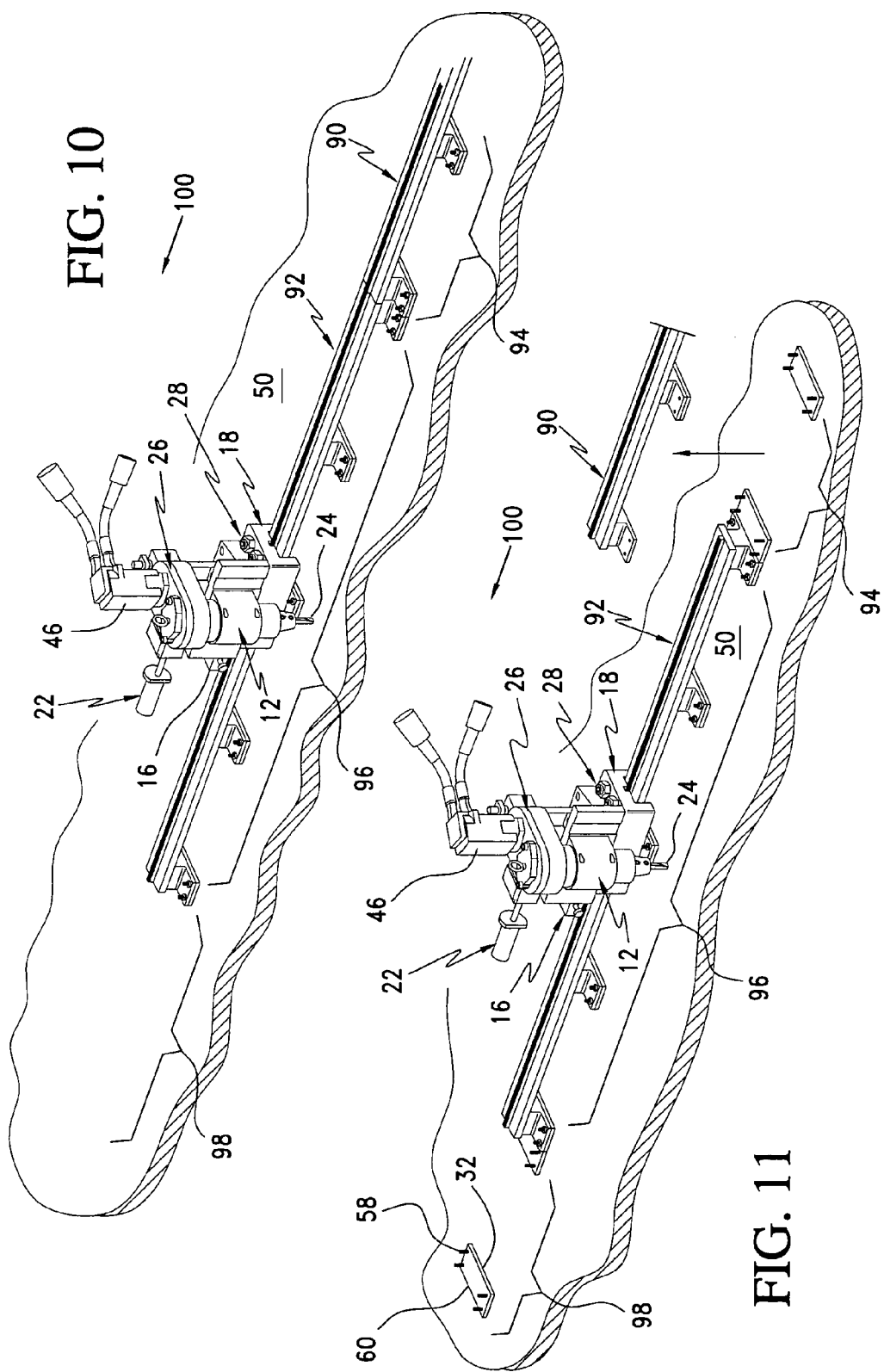

CUTTING AND BEVELING TOOL

This application is a continuation-in-part of application Ser. No. 10/776,181 filed Feb. 12, 2004, now U.S. Pat. No. 6,966,731 claiming the benefit of provisional application Ser. No. 60/450,699 filed Mar. 3, 2003.

BACKGROUND

Numerous portable cutting tools are known in the art of cutting workpieces having flat and curved surfaces. In relation to cutting pipes, portable pipe cutting tools are typically used in the field where the use of a fixed machining tool is not appropriate or possible. Types of conventional pipe cutting tools include portable lathes such as those described in U.S. Pat. Nos. 4,418,591 and 4,665,782, or roller cutter modules such as one described in U.S. Pat. No. 5,515,756.

Generally, conventional portable pipe cutting tools include a rotary tool head carrying a fixed or rotary cutting tool that is driven in rotation about an axis while otherwise fixedly supported relative to the pipe by clamps or a mandrel. Normally, a single-point tool is fed around and into the pipe repeatedly to remove a small amount of material each pass until the pipe is cut through, which in the case of a thick wall may consume a considerable amount of time.

In conventional pipe cutting tools, it is a challenge to locate and support the cutting tool so that smooth and true machining operations can be performed at high tool loadings, while maintaining bearing assemblies free of gross contamination from chips or other debris generated during the machining operation. High radial and thrust loads are encountered during high speed machining of thick walled pipe made of stainless steel and other hard materials, and such machining loads require the use of massive and complicated tool support assemblies.

Known pipe cutting tools are typically designed to fit pipe sizes within certain ranges. Furthermore, such tools may be limited to cutting only pipes and therefore lack the versatility to perform cutting operations on flat or arcuate surfaces.

Another known approach to cutting workpieces, especially larger pieces, involves the use of track guidance systems that comprise a drive track for guiding and feeding a cutting tool along the surface of a workpiece. Conventional track systems known in the art include large structural track systems encircling and rigidly secured to a workpiece such as one a described in U.S. Pat. No. 4,297,061, track systems that are connected to structural members not supported directly onto a workpiece such as one described in U.S. Pat. No. 5,403,133 or lightweight track systems such as those described in U.S. Pat. Nos. 4,570,542 and 6,494,307 that are directly attached to a workpiece with magnets or suction cups. It has been found, however, that conventional cutting tool and track systems are either not easily or quickly attachable or removable from a workpiece. In the alternative, the conventional track system may be insufficiently robust to withstand the rigors of high speed, high load machining.

In the case of preparing a pipe severed by using one of the aforementioned methods, the severed end surface of the pipe is typically beveled to enable welding of such surface to another pipe. While there are numerous tools that impart a beveled surface onto a pipe end surface, such tools are not typically arranged to both simultaneously cut and impart a bevel to the pipe end surface.

Therefore, it is desirable to provide a cutting tool and tool carrier that is highly portable, while sufficiently robust to withstand high machining loads and configured to be rigidly secured to a workpiece. It is also desirable to provide a cutting tool and track guidance system which can accommodate a variety of workpieces whether tubular, flat or arcuate, and precisely cut through such workpieces in a minimal amount of time. Moreover, it is desirable to provide a cutting tool that is capable of imparting a beveled surface to the severed workpiece simultaneously as such workpiece is cut.

SUMMARY

The present invention provides a cutting tool assembly and tool carrier for simultaneously cutting and beveling workpieces. The cutting tool assembly and tool carrier are adapted to be quickly attachable and removable from a workpiece, while being sufficiently robust to withstand high machining loads.

In accordance with an embodiment of the invention, the tool carrier includes a track assembly configured to be mounted onto a workpiece, and comprises a multi-segment track assembly formed of multiple, connected track elements. Each track element includes at least one track member and a track member supported along the longitudinal length of the track member.

According to another embodiment of the tool carrier, the tool carrier has a generally annular workpiece-engaging support housing member and a tool carrier ring member mounted on the end of the tool housing member for rotation relative thereto.

In accordance with a feature of the invention, the cutting tool assembly includes a cutting tool arranged to be rotated about a longitudinal axis, and to be fed along its axis of rotation and transversely of its axis of rotation for cutting a workpiece through a wall thickness of the workpiece. The cutting tool assembly further includes a tool driving system connected and arranged to transmit rotary input motion to the cutting tool.

According to a variation of the cutting tool assembly, the cutting tool comprises a plain beveled profile relative to the axis of rotation of the cutting tool. In other variations, the cutting tool may comprise a conventional end mill, a compound beveled profile, a standard "J-type" joint preparation, or a compound "J-type" joint preparation.

In accordance with another feature of the invention, the cutting tool and mounting system includes a tracking assembly extending from the cutting tool assembly that is arranged to follow the contour of an outer surface of the workpiece. The cutting tool is regulated by the tracking assembly and will machine a uniformly severed workpiece surface on out-of-round tubes and pipes, and provide a bevel to the severed tube or pipe end.

According to a variation of the tracking assembly, a tracking assembly housing is provided with a support member slidably mounted therewithin. The support member carries a tracking element connected at one end thereof, and a plurality of springs bias the support member against the tracking assembly housing in a direction such that the tracking element is oriented away from the tracking assembly housing.

The invention includes methods for cutting flat and arcuate workpieces wherein at least one cutting tool is supported on a workpiece for travel about a portion of the workpiece along a predetermined transport path. According to one method of the invention, the cutting tool rotatably supports a cutting tool having a beveled profile that is positioned generally transversely to an adjacent workpiece surface. The cutting tool is fed radially through the wall thickness of the workpiece, and is subsequently fed along the transport path to cut the workpiece in a single pass along the transport path, such path defining a cutting plane if the tool is rotated about a pipe axis. As the cutting tool is rotated, the depth of the cutting tool is tracked relative to the adjacent surface of the workpiece as the cutting tool assembly is moved along the transport path to assure a uniform preparation of the severed workpiece end surface.

BRIEF DESCRIPTION OF THE DRAWINGS

These and other features, aspects, and advantages of the present invention will become better understood with regard to the following description, appended claims, and accompanying drawings where:

FIGS. 10-13 are schematic perspective views illustrating the transfer of a track element to a different position adjacent another track element on a workpiece;

DETAILED DESCRIPTION OF VARIOUS EMBODIMENTS

A. Overview

Figure 1:
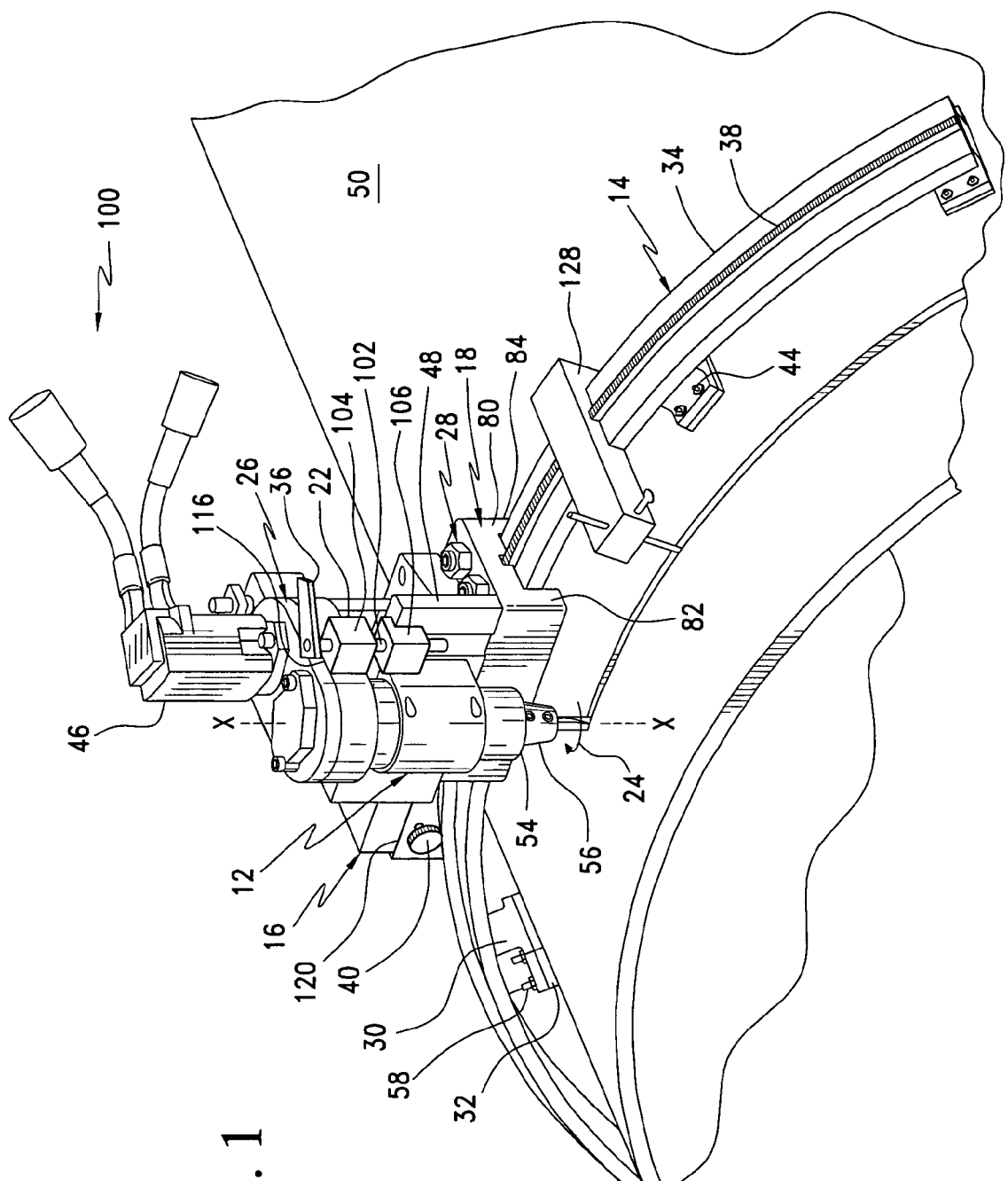
FIG. 1 is a perspective view showing an embodiment of a cutting tool supported on a workpiece.

A better understanding of different embodiments of the invention may be had from the following description read in conjunction with the accompanying drawings in which like reference characters refer to like elements.

While the disclosure is susceptible to various modifications and alternative constructions, certain illustrative embodiments thereof are shown in the drawings and will be described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure and defined by the appended claims.

It will be understood that, unless a term is expressly defined in this patent to possess a described meaning, there is no intent to limit the meaning of such term, either expressly or indirectly, beyond its plain or ordinary meaning.

Any element in a claim that does not explicitly state "means for" performing a specified function, or "step for" performing a specific function, is not to be interpreted as a "means" or "step" clause as specified in 35 U.S.C. § 112, paragraph 6.

B. Environment and Context of Embodiments

Embodiments of the invention are discussed in the context of application on a workpiece such as a pipe, tube, or a plate. As will be explained below, a cutting tool assembly may be mounted on a tool carrier, such as split frame portable machine such as those described in U.S. Pat. No. 4,418,591, granted Dec. 6, 1983, and U.S. Pat. No. 4,665,782, granted May 19, 1987, commonly owned by the assignee of this application and incorporated herein by reference. Alternatively, the cutting tool assembly may be mounted on a track system described in co-pending U.S. application Ser. No. 10/776,181 filed Feb. 12, 2004 of which this application is a continuation-in-part.

In accordance with this description, workpieces to be severed and arranged for welding are prepared so that the ends of such workpieces are beveled for mating with a complimentary end of another similarly prepared workpiece. While the workpieces are primarily described as tubular metal sections, the principle underlying of the invention can be utilized with plate workpieces as well, in which case the butting sections of workpieces would be prepared so as to have an appropriate total bevel angle between such workpieces suitable for welding or other joining or preparing operations.

C. Various Embodiments of the Invention

Figure 2:
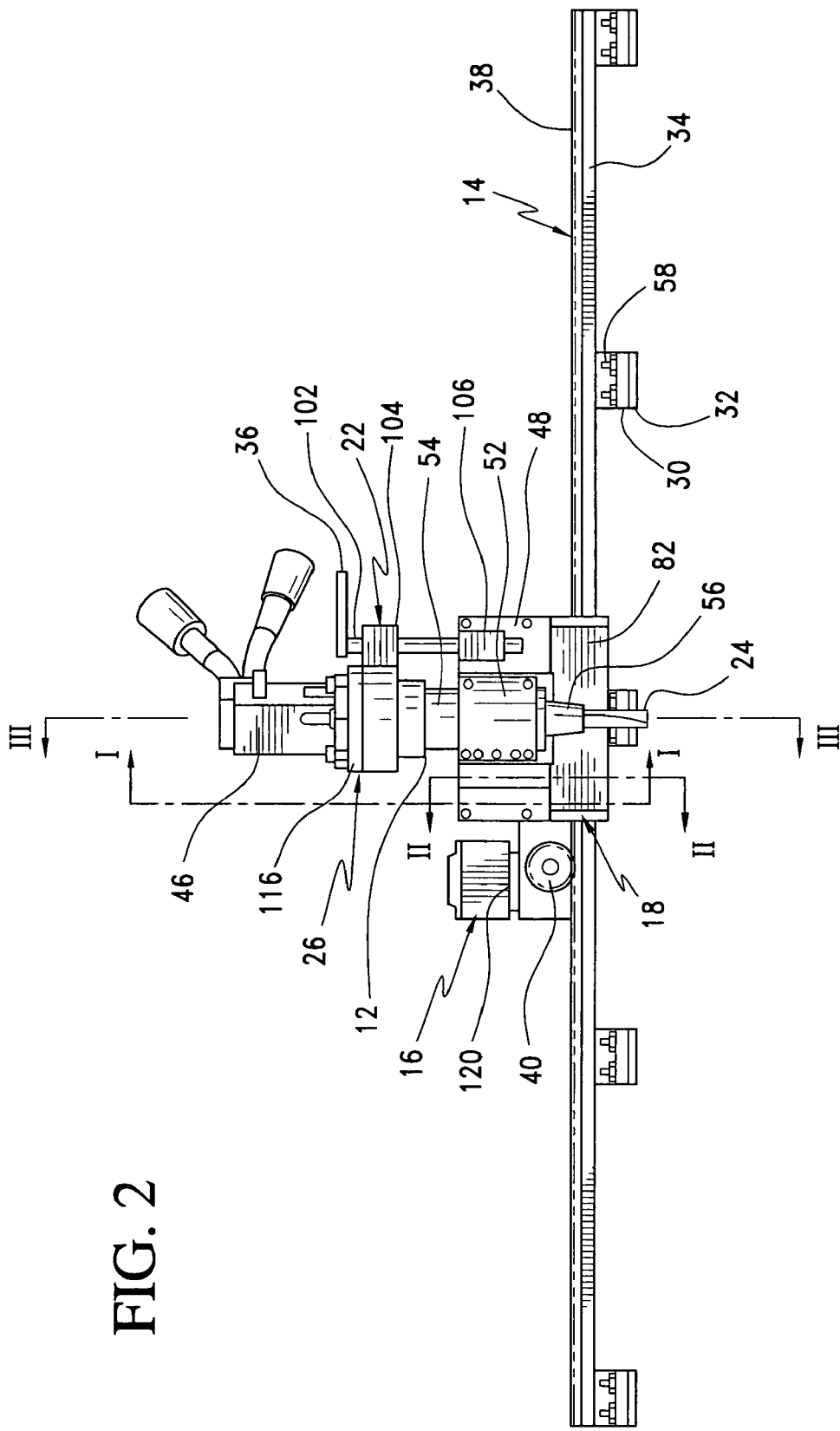
FIG. 2 is an elevational front view showing the cutting tool of FIG. 1.

FIGS. 1-2 show views of a cutting tool and track system 10 according to an embodiment of the invention. The cutting tool and track system 10 comprises a multi-segment track assembly 14 formed of multiple track elements arranged to support a carriage assembly 18 carrying a cutting tool assembly 12 and connected to a carriage drive mechanism 16 for displacing the carriage assembly 18 along the track assembly 14.

In this embodiment, each track element includes a track member 34 that may be sufficiently flexible to generally conform to a workpiece having a curved surface. Preferably, the track member 34 is flexible to a degree that will permit the track member 34 to be directly bent to match the geometry of a workpiece. The track member 34 has top, bottom and side surfaces, and may have a substantially rectangular cross-section. The track member 34 is preferably constructed from flexible, high strength carbon steel, or other materials suitable for achieving the purposes of the track member described herein.

A rack member 38 is attached to the top surface of the track member 34 and extends substantially along the longitudinal length thereof. In one embodiment, the rack member 38 may include a plurality of rack segments which are generally assembled in an end-to-end relationship along the longitudinal length of the track member 34. Alternatively, in another embodiment, the rack member 38 may consist of a single body having generally the same length as the track member 34. The rack member 38 includes a plurality of teeth that are configured to engage with a drive pinion 40 of the carriage drive mechanism 16. The rack member 38 may be welded, attached by suitable fastening elements, or secured to the track member 34 by any other suitable means. The rack member 38 is preferably made of flexible, high strength carbon steel, or other materials suitable for achieving the purposes of the rack member described herein.

A plurality of supports 30 having a base portion with a plurality of support holes 44 are attached to the bottom of the track member 34. The supports 30 may be attached to the bottom of the track member 34 in any conventional manner, including by welding or using appropriate fasteners.

According to this embodiment, supports 30 are configured to be rigidly supported to a workpiece by being positioned on securing elements 32 secured to a workpiece. Each securing element 32 may comprise a support plate 60 arranged to be welded onto the workpiece, and configured and dimensioned to substantially receive a bottom portion of a support 30. The securing elements 32 may include a plurality of studs 58 that are configured to be received by the support holes 44 of the supports 30 and secured therewith by suitable fasteners.

In the embodiment shown in FIGS. 1 and 2, and as will be discussed more fully in reference to FIGS. 10-13, each track element of the track assembly 14 is configured to be assembled with another track element of the invention in an end-to-end relationship. This end-to-end relationship is defined as the track members of adjacent track elements being positioned laterally adjacent to one another so as to define a single transport path for a cutting tool. Accordingly, the track member 34 of each track element may include connector elements, such as interlocking tongue and groove joints, slot and tab connections, bayonet connectors or screw-type connectors that are arranged at opposed end portions of each track member 34 to connect to corresponding connector elements of adjacent track elements.

FIG. 1 illustrates a location guide 128 securable on the track member 34 and having a pin indicating the location of the centerline of a cutting plane on the workpiece.

Figure 3:
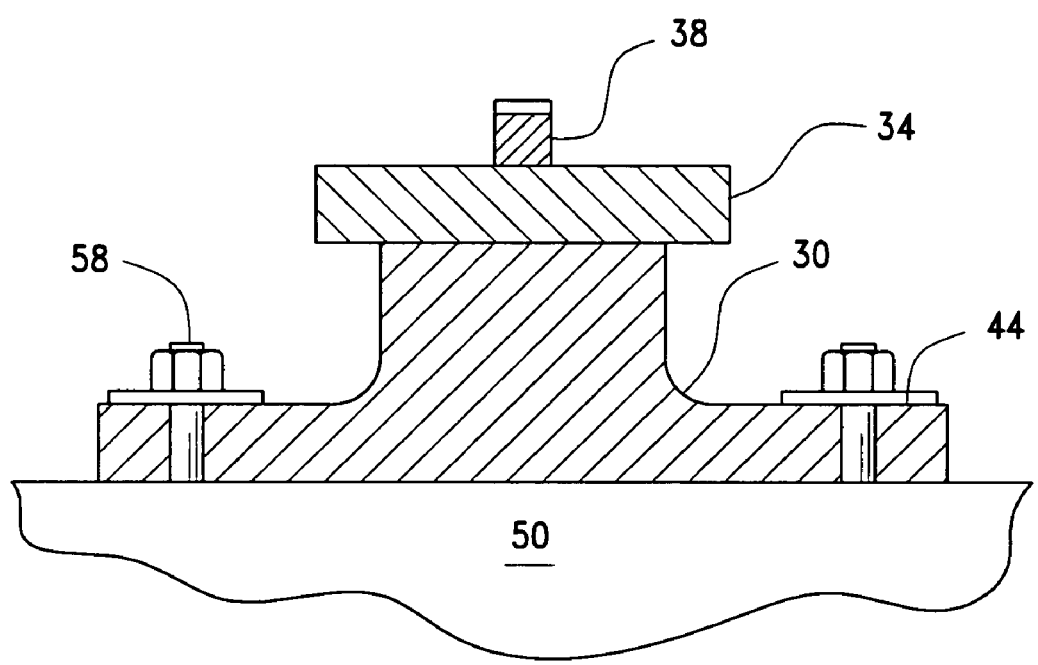
FIG. 3 shows a cross-section view of an embodiment of the track assembly in FIG. 1.

In the embodiment shown in FIG. 3, the securing elements 32 may comprise studs 58 that are welded directly onto a workpiece by a stud welding gun and configured to be received by the support holes 44 and secured to the supports 30 by suitable fasteners. Examples of a stud welding gun are disclosed in U.S. Pat. Nos. 6,025,569 and 6,476,339.

According to the embodiment shown in FIG. 2, the carriage drive mechanism 16 includes a motor housing 120 that contains a high torque motor (not shown) connected to a drive pinion 40. The high torque motor may be energized by electrical, fluid, pneumatic or other available energy. The carriage drive mechanism 16 may provide a gear reduction system (not shown) supported within the motor housing 120 and enabling the use of the high torque motor to transmit input rotational drive motion to the drive pinion 40. For example, the carriage drive mechanism 18 may include a hydraulic motor produced by Anchor Lamina Inc., part no. A-125 and connected to a gear reducer produced by Boston Gear Co., part no. WA-718-200-G. Such carriage drive mechanisms include components that are well known in the art and any such assembly could be utilized without exceeding the scope of this invention.

Figure 4:
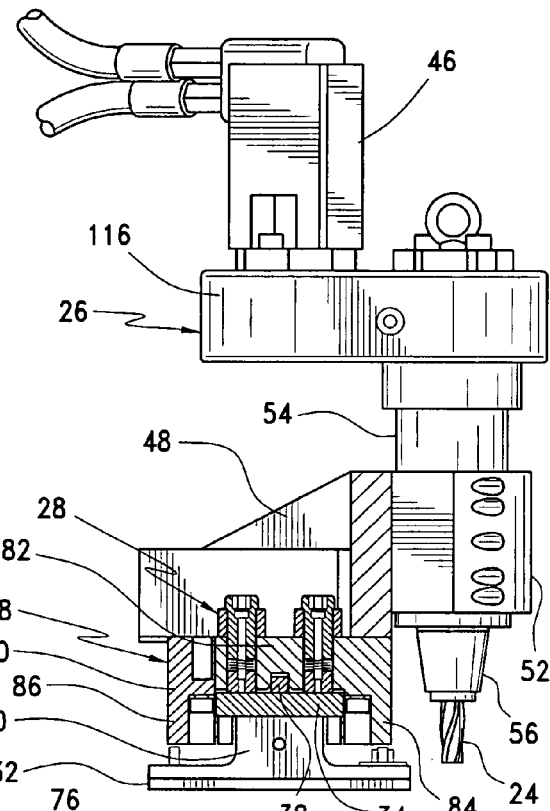
FIG. 4 is cross-section view taken along line I-I in FIG. 2.
Figure 5:
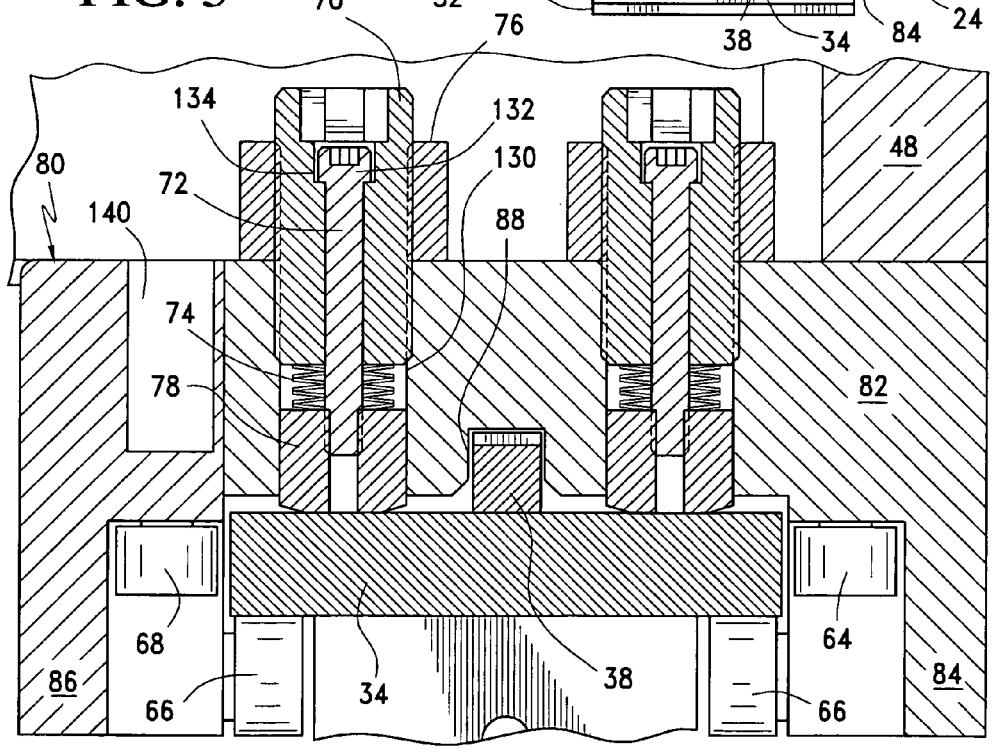
FIG. 5 is a sectional view of the adjustable bearing assembly of the carriage assembly according to FIG. 4.

In the embodiment shown in FIGS. 1 and 2, the cutting tool assembly 12 is secured to an angle plate 48 having a generally perpendicular profile and supported to the carriage assembly 18. The angle plate 48 is generally configured to support the cutting tool assembly 12 in a substantially perpendicular position relative to the carriage assembly 18. It will be understood, however, that the angle plate 48 is not limited to having a generally perpendicular profile and any suitable profile of an angle plate may be utilized to position the cutting tool assembly 12 relative to the carriage assembly 18. FIGS. 4 and 5 illustrate an embodiment of a carriage assembly 18 that includes a deck carriage 80 having a substantially planar platform 82 with top and bottom surfaces and a pair of opposed flanges 84, 86 depending from the sides of the platform 82. The opposed flanges 84, 86 may be integrally formed from the platform 82 or connected with suitable fasteners as exemplified with flange 86. The top surface of platform 82 is arranged to support an angle plate 48 that is configured to connect the tool assembly 12 with the carriage assembly 18. The bottom surface of the platform 82 is provided with a cam follower arrangement 64, 66. Moreover, the bottom surface of the platform 82 includes a longitudinal groove 88 defined along the length thereof that is configured and dimensioned to receive the rack member 38 when supported on the track assembly 14. The deck carriage 80 is arranged to support at least two adjustable bearing assemblies 28 that are configured to extend through threaded holes 130 of the platform 82 and ride along the top surface of the track member 34 of the track assembly 14.

Figure 6:
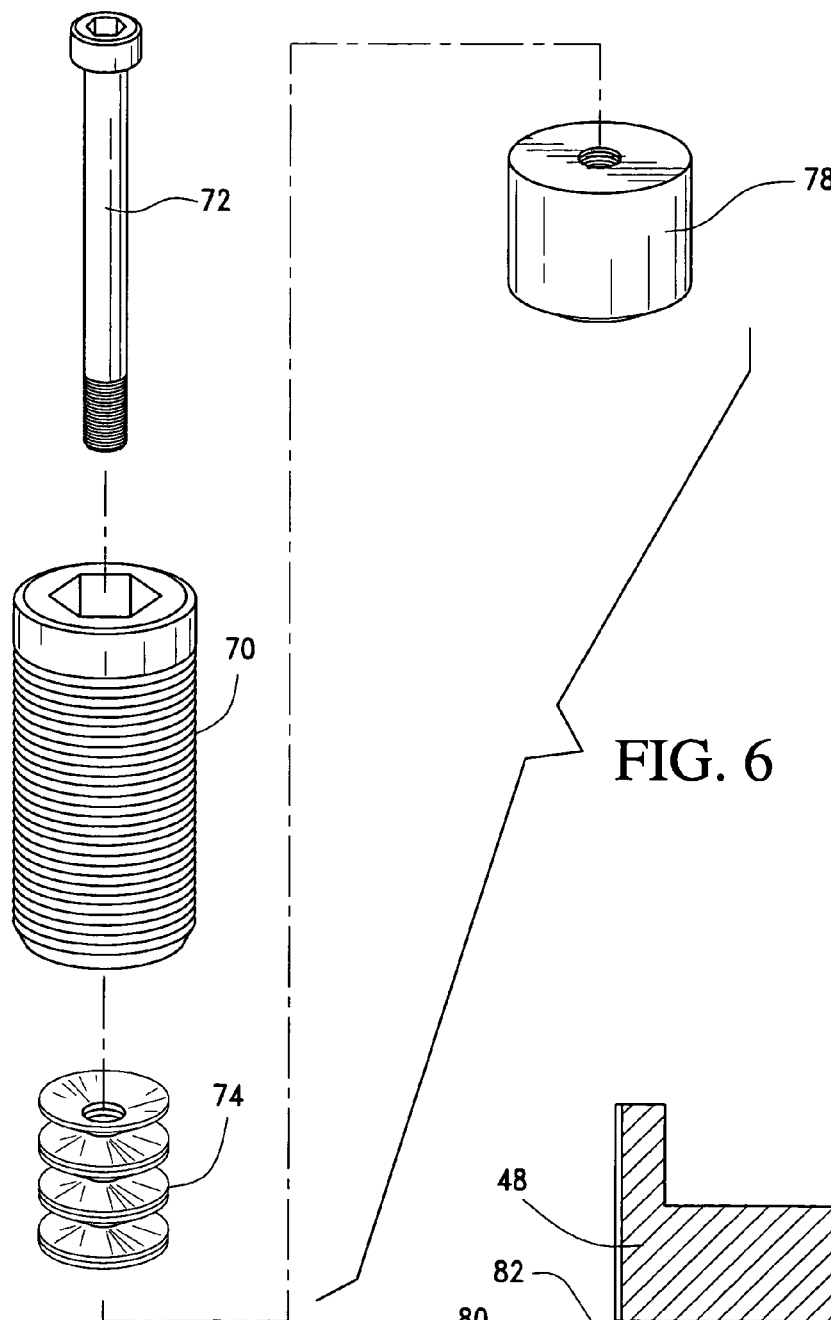
FIG. 6 is an exploded perspective view of the adjustable bearing assembly according to FIG. 5.

In the embodiment illustrated in FIGS. 5 and 6, the adjustable bearing assembly 28 is shown as being received and supported by the deck carriage 82. The bearing assembly 28 includes a pin element 72 having a head portion 134 and a threaded distal end that extends through a sleeve member 70 and one or more Belleville springs 74 (for example, conical compression type springs) to engage a bearing 78. The head portion 132 of the pin element 72 is configured to rest against an internal shoulder portion 134 of the sleeve member 70. The sleeve member 70 includes external threads which engage the threaded hole 130. A retaining nut 76 is provided which is configured to engage the external threads of sleeve member 70 and is secured against the top surface of the deck platform 82.

The Belleville springs 74 are slightly deformed when positioned between the sleeve member 70 and bearing 78. When the retaining nut 76 is tightened against the deck platform 82, the bearing assembly 28 is secured into position relative to the carriage assembly. If the retaining nut 76 is loosened, the bearing assembly 28 may be selectively loosened or tightened relative to the track member 34.

Figure 7:
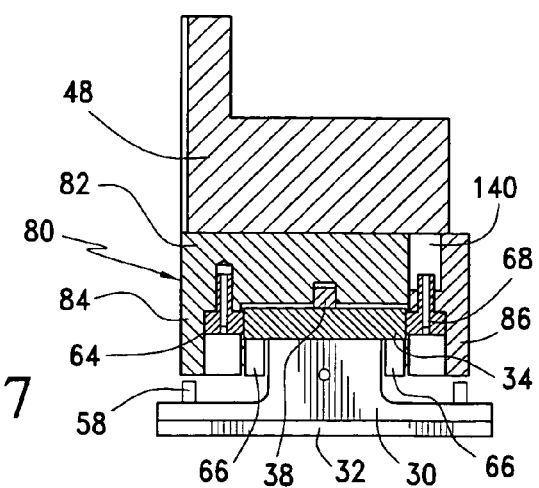
FIG. 7 is a cross-section view taken along line II-II in FIG. 2.

As shown in FIGS. 4, 5 and 7, an embodiment of the cam arrangement includes a plurality of cam followers 66 having axles protruding perpendicular from flanges 84, 86 of the deck carriage 80. The cam followers are configured to ride along the bottom surface of the track member 34. The cam arrangement may also include at least one cam follower 64 having axles protruding parallel from one of the flanges 84, 86 and configured to ride along a side surface of the track member 34.

At least one adjustable cam follower 68 may be included which is adjustably connected within slot 140 formed in one of the flanges 84, 86 and having an axle extending generally parallel to the flange 84, 86. The adjustable cam follower 68 may be locked in place by a set screw to the flange 84, 86 when positioned in a desired position relative to the track member 34. Generally, the desired position is such that the adjustable cam follower 68 draws the deck carriage 80 against the side surface of the track member 34 to thereby eliminate play between the deck carriage 80 and the track member 34.

The specific cam arrangement disclosed herein may be varied in accordance with known principles, provided that a suitable force is applied to the track member 34 so that the carriage assembly 18 is securely retained on the track member 34 as the carriage assembly 18 carrying the tool assembly 12 is driven along the transport path 100.

Figure 8:
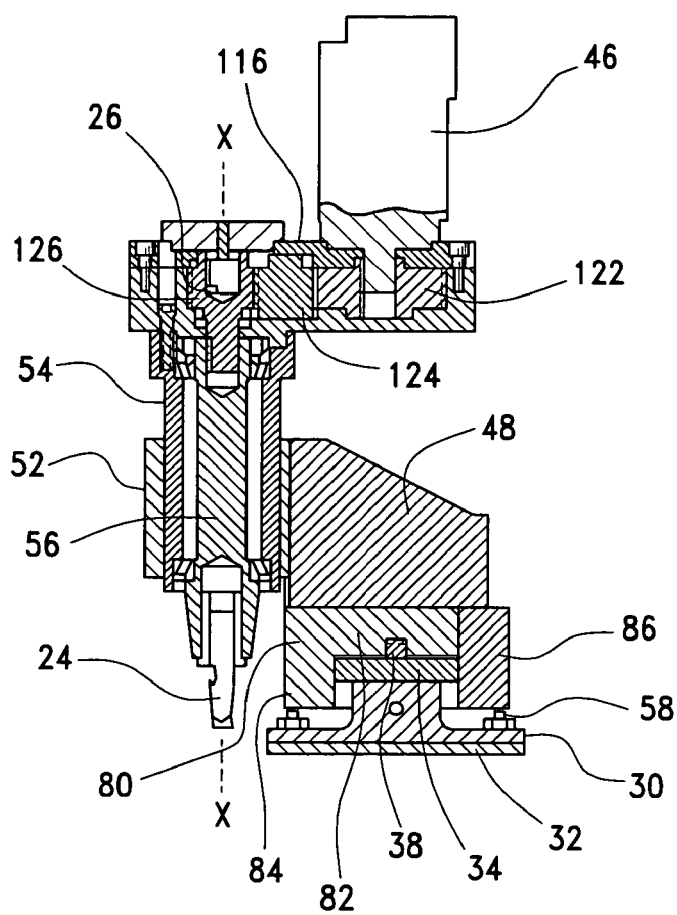
FIG. 8 is a cross-section view taken along line III-III in FIG. 2.

According to an embodiment illustrated in FIG. 8, the cutting tool assembly 12 includes a spindle 56 rotatable about longitudinal axis X-X and positioned in spindle housing 54. The spindle housing 54 is slidably positioned within spindle support 52 secured to the angle plate 48. The spindle 56 is arranged to receive a cutting tool 24, such as a conventional end mill, beveling bit or other suitable rotary cutting tool, that is secured to the spindle 56 with a suitable clamping arrangement or fasteners. A tool drive mechanism 46 is connected to an appropriate rotary motion transmitting device or a gear assembly 26 that is connected to the spindle 56 to transmit rotary input motion to the spindle 56 about longitudinal axis X-X. Appropriate bearings are provided to support the spindle 56 for rotary motion within the spindle housing 54 and to enable axial displacement relative to the spindle housing 54. Such cutting tool assemblies are well known in the art and such conventional assemblies can be utilized without exceeding the scope of this invention. The tool drive mechanism 46 may be activated electrically, hydraulically, or pneumatically.

An embodiment of the gear assembly 26 includes a stationary gear housing 116 containing a gear arrangement and may be supported to the spindle housing 54. The gear arrangement may include a drive gear 122 operatively connected to the tool drive mechanism 46 for rotation therewith. The drive gear 122 may be arranged to engage with a transfer gear 124 which in turn may engage a rotatable component or gear 126 concentrically supported about a proximal end of the spindle 56 for rotation therewith. Such gear assemblies are well known in the art and any such assembly could be utilized without exceeding the scope of this invention.

Figure 9:
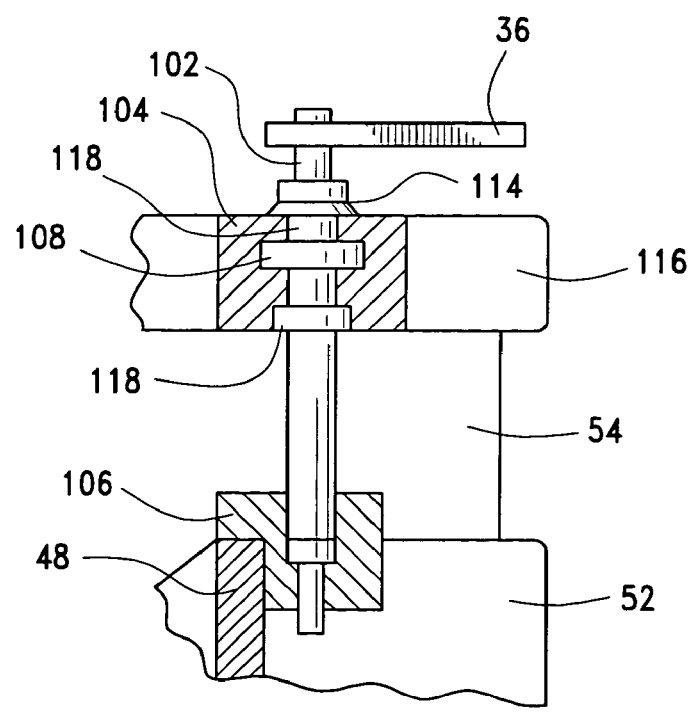
FIG. 9 is a cross-sectional view of the feed mechanism in FIG. 2.

Referring to FIG. 9, an embodiment of the feed mechanism 22 includes a feed screw 102 having threaded proximal and distal ends, and is arranged to extend through an upper plate 104 rigidly secured to the gear box assembly housing 116 and a lower plate 106 rigidly secured to a shoulder 68 of the angle plate 48. The feed screw 102 may be configured to extend through flanged bushing 114 disposed above the upper plate 104 and connect to a ratchet device 108 disposed in the upper plate 104. The proximal end of the feed screw 102 is connected to a feed lever 36 disposed above the upper plate 102 and the distal end of the feed screw 102 is connected to a threaded feed nut 112 secured within the lower plate 106. Appropriate bearings 118 may be used to support the feed screw 102 within the upper and lower plates 104, 106.

The feed lever 36 is arranged to be pivoted to advance the feed screw 102 along the threads of the feed nut 112 to thereby move spindle 56 relative to the shoulder 68 of the angle plate 48. The feed mechanism arrangement may be varied in accordance with known machine tool principles for advancing a tool head towards a workpiece.

Having described the preferred embodiments of the various subassemblies of a track supported tool according to the present invention, the features and advantages of its operation will be described.

As shown in FIG. 1, the track assembly 14 is supported on the periphery of pipe 50. In particular, the track member 34 and rack member 38 are supported and flexed about a portion of the peripheral surface of a pipe 50 having a central axis. The track assembly 14 is connected to the pipe 50 with the securing elements 32 including support plates 60 welded onto the pipe and which receive supports 30 connected to the track member 34. As shown, the mount studs 58 extend through the support holes 44 of the supports 30 and are secured with suitable fasteners. The drive mechanism 16 is secured to the carriage assembly 18 mount the tool assembly 12 and positioned on the track assembly 14 such that the pinion 40 meshes with the rack member 38.

The spindle 56 is illustrated as having been moved into an appropriate position by the feed mechanism 22 whereby the cutting tool 24 is being rotatably driven by tool drive mechanism 46 about longitudinal axis X-X. The cutting tool 24 is fed radially through the wall thickness of the pipe 50 along its rotational axis and is driven transversely of its rotational axis by the carriage drive mechanism 16 on transport path 100 along the track member 34 to remove pipe material and thereby cut the pipe 50.

As shown in the embodiment of FIG. 2, the cutting tool 24 is an end mill which is firstly rotated about its rotary axis and fed through the wall of the pipe 50. The cutting tool assembly 12 is subsequently driven along the transport path in one pass to cut off a portion of the pipe 50 with the peripheral cutting edge of the end mill cutting through the thickness of the workpiece.

Figure 12:
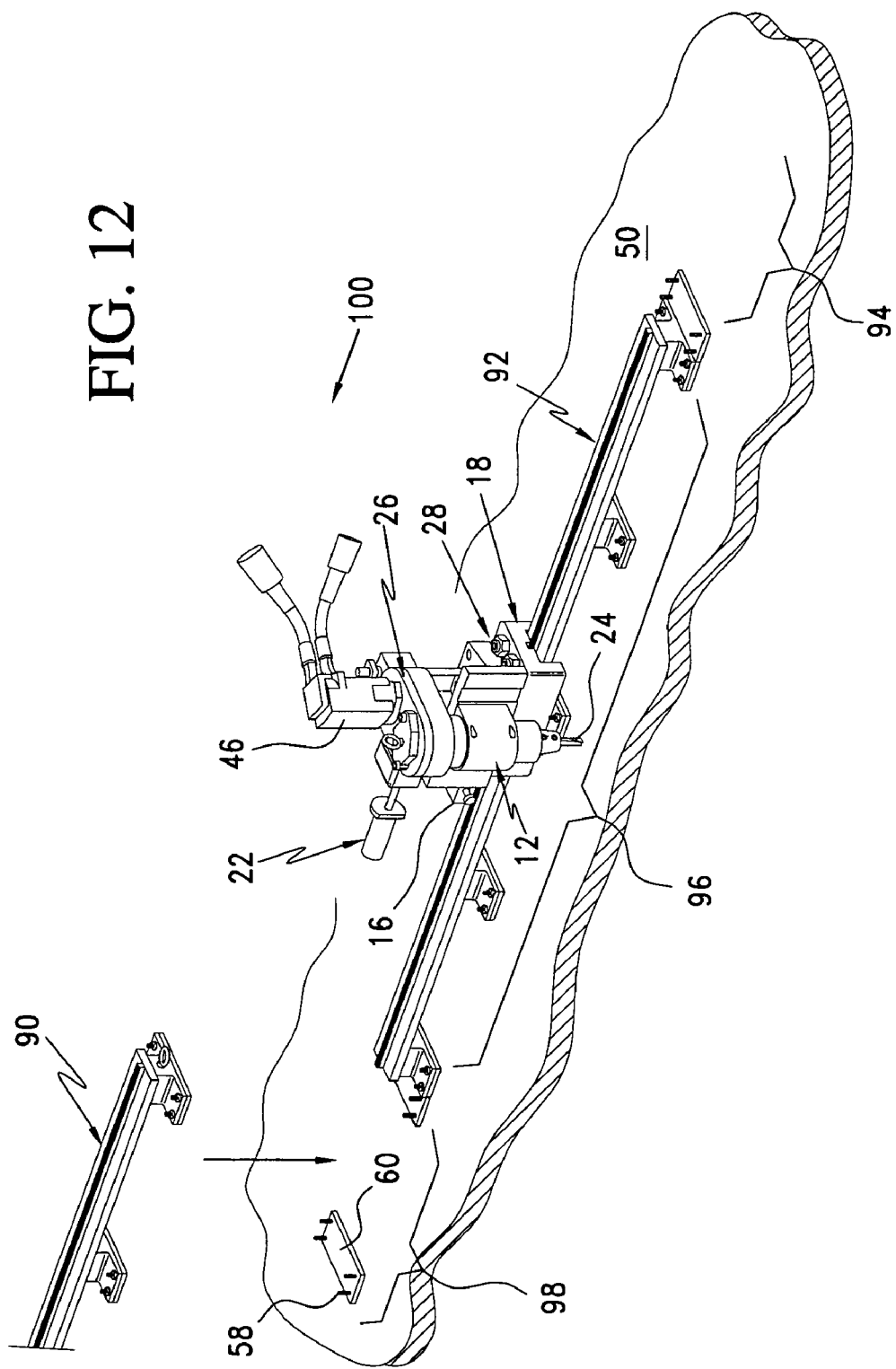
Figure 13:
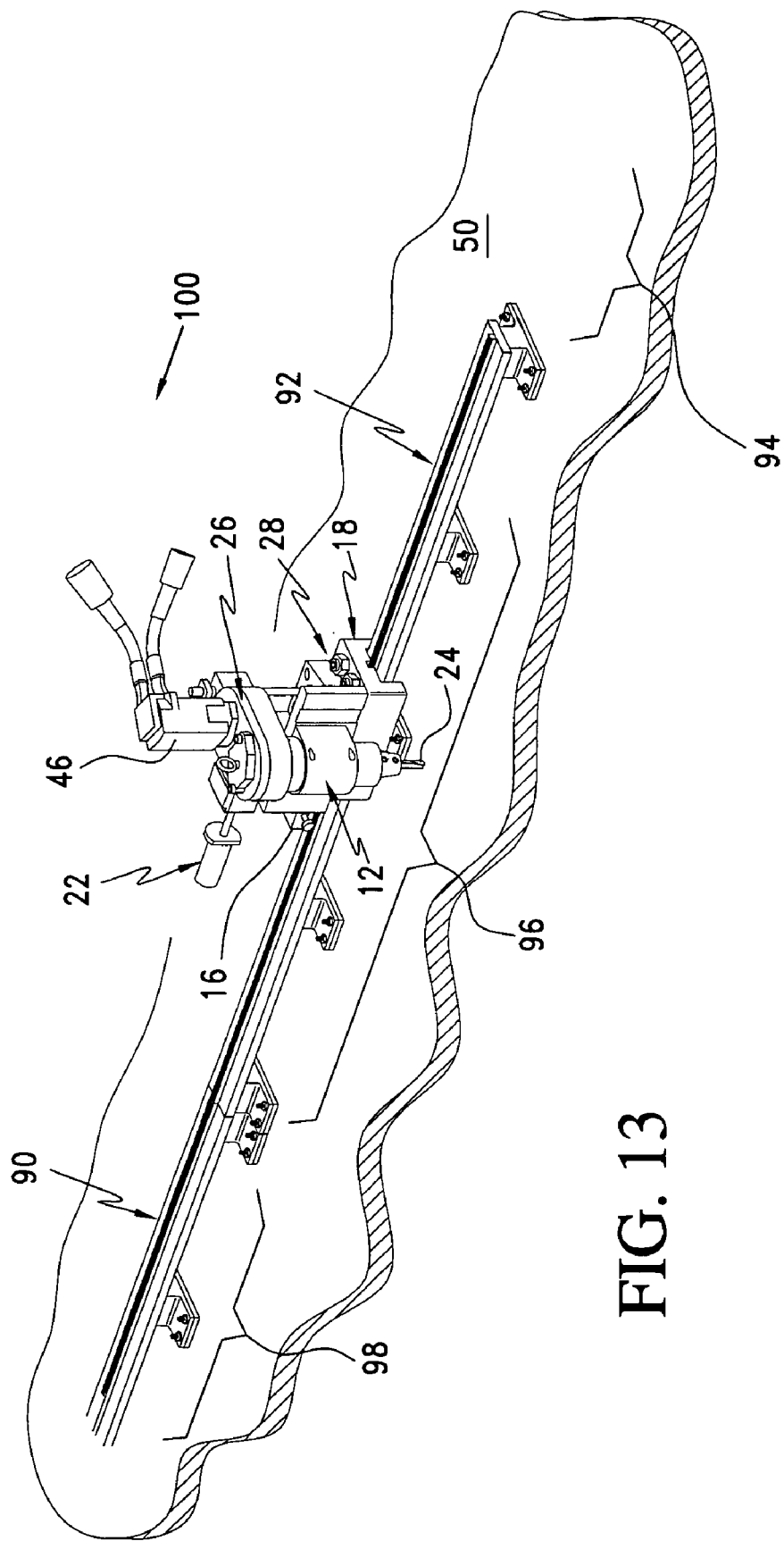

Referring to FIGS. 10-13, the invention may include a plurality of track elements 90, 92 that can be continuously reassembled in an end-to-end relationship along the workpiece 50. FIG. 10 shows first and second track elements 90, 92 positioned on first and second track areas 94, 96 and assembled in an end-to-end relationship such that end portions of the first and second track elements 90, 92 are laterally adjacent and define transport path 100. FIG. 11 shows the removal of the first track element 94 from the first track area 94. Securing elements 32 are appropriately supported onto the workpiece 50 in the third track area 98 and the securing elements 32 are removed from the first track area 94. FIG. 12 shows the first track element 90 being positioned over the third track area 98. FIG. 13 shows the first track element 90 supported on the securing elements 32 positioned in the third track area 98 thereby extending the length of the transport path 100 relative to the second track element 92. The above-described process may be carried out over the length or diameter of the periphery of the workpiece.

Figure 14:
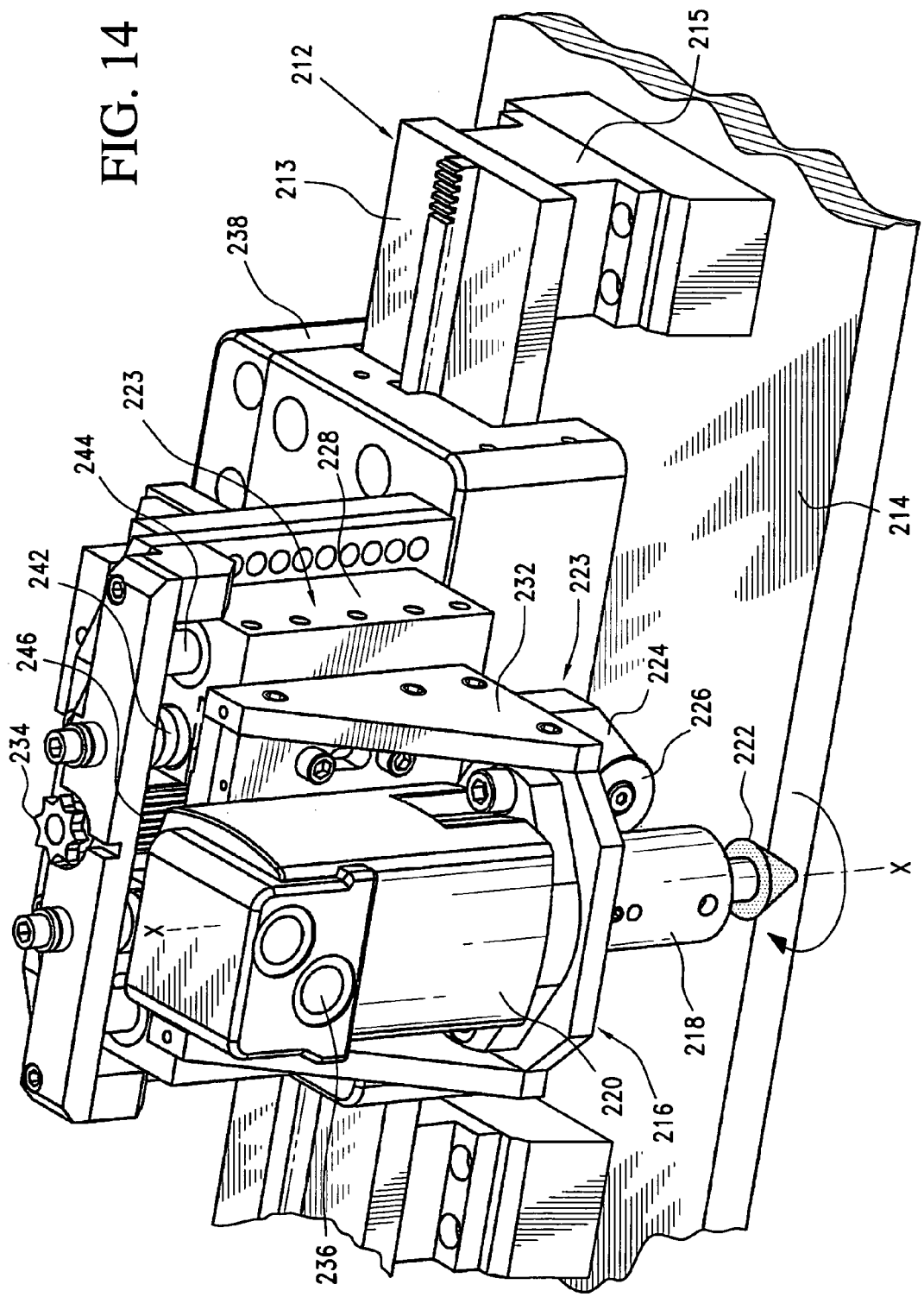
FIG. 14 is a perspective view showing another embodiment of a cutting tool mounted on a track assembly supported on a workpiece.
Figure 15:
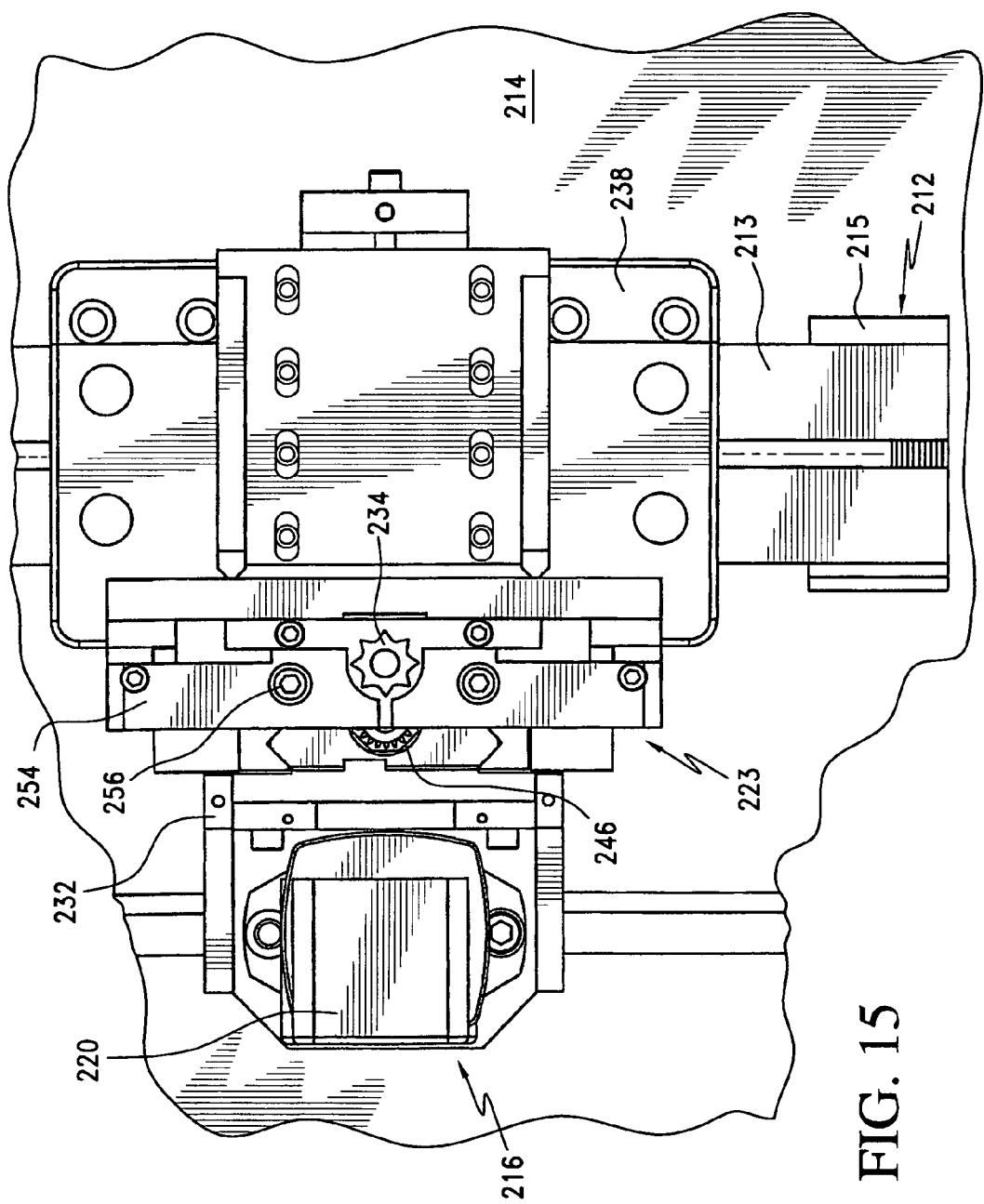
FIG. 15 is a top plan view of the cutting tool on a track assembly of FIG. 14.

In accordance with another embodiment of the invention, FIGS. 14 and 15 illustrate a cutting tool assembly 216 and track mounting system 212. The cutting tool assembly 216 is generally of the type described above in connection with the embodiment referred to in FIGS. 1 and 2 with the exception that this embodiment employs a beveling bit 222. As with the end mill described above, the beveling bit 222 is arranged to be rotated about a longitudinal axis and a tool drive mechanism 220 to transmit rotary input motion to the beveling bit 222. The beveling bit 222 is secured by a spindle 218 driven by the tool drive mechanism 220, and can be fed along its axis of rotation and transversely of its axis of rotation for cutting a workpiece 214 through a wall thickness thereof.

Appropriate inlet ports 236 are provided which are configured for coupling to pneumatic or other power sources for powering the cutting tool assembly 220. As with the other embodiments described thus far, the cutting tool assembly 220 is arranged to be mounted onto a workpiece 214 by a track system 212 comprising track members 213 and a plurality of supports 215 mounted on the workpiece 214. A carriage assembly 238 is used to drive the cutting tool assembly 220 along the track members 213 in a fashion similar to those described above. It will be understood, however, that any other drive system may be used to transport the cutting tool assembly 220 along the track members 213 that would be expedient to one skilled in the art. An angle plate 232, or other suitable mounting means is provided to connect the cutting tool assembly 216 to the carriage assembly 238.

Unlike the other embodiments described thus far, this embodiment includes at least one tracking assembly 223 that is connected to the cutting tool assembly 220 and is arranged to follow the contour of an outer surface of the workpiece 214. The tracking assembly 223 is provided for assuring a uniform bevel along a severed end surface of a workpiece, and may also be utilized for assuring a uniform depth of cut when severing a workpiece, in particular pipes or tubes.

Figure 16:
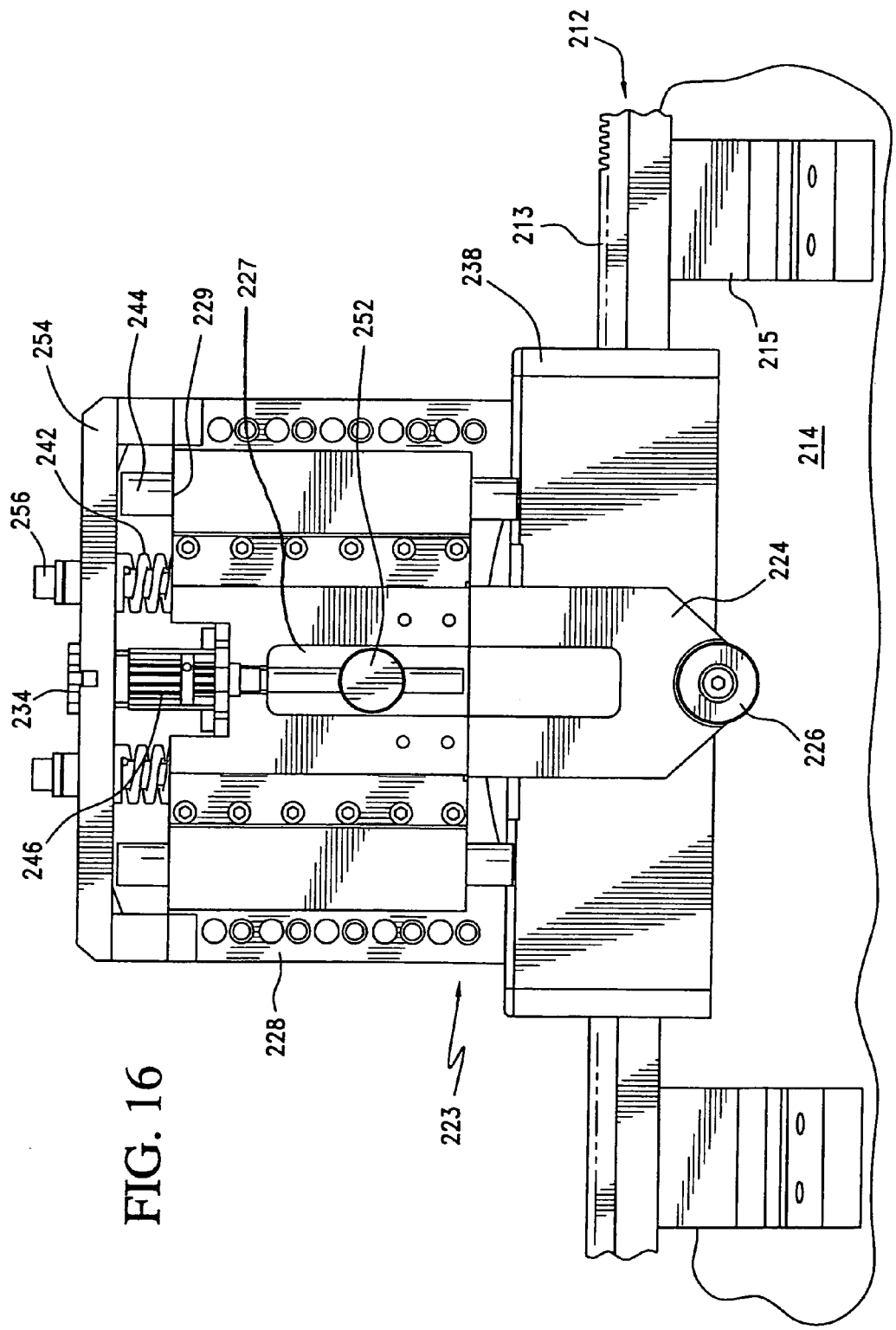
FIG. 16 is a front elevational view showing an embodiment of the tracking assembly of FIG. 14.

In accordance with an embodiment shown in FIG. 16, the tracking assembly 223 includes a housing 228 having at least two shafts 244 spanning the height thereof. A support member 224 is provided which defines opposed first and second ends, and a longitudinal slot 227 extending along a longitudinal length thereof. The support member 224 further defines at least two through holes 229 that extend along the longitudinal axis of the support member 224, and are configured for mounting on the shafts 244. The support member 224 is slidably mounted within the assembly housing 228 via the shafts 244. In addition, a retaining member 252 is connected to the tracking assembly housing 228 and is oriented perpendicular relative to the support member 228 and extends through the longitudinal slot 227 thereby limiting the travel of the support member 224 relative to the housing 228.

A tracking element 226 is mounted at the first end of the support member 224. The tracking element 226 is preferably a rotatable wheel which is configured for rotation along the surface of a workpiece. A plurality of spring elements 242 are provided for biasing the support member 224 against the tracking assembly housing 228 in a direction such that the tracking element 226 is oriented away from the tracking assembly housing 228. As shown in FIG. 16, the spring elements 242 are preferably coaxial to each of the shafts 244 and are positioned between the support member 224 and the housing 228.

A suitable tool advancing arrangement is provided to move the support member 224 towards and away from a workpiece surface 214. For example, as shown in the embodiment of FIG. 16, a conventional star wheel 234 may be utilized in cooperation with a spindle device 246 to cause advancement of the support member 224 towards and away from the workpiece surface 214.

As shown in FIGS. 14 and 15, the tracking assembly 223 is preferably positioned so that the axis of rotation of the tracking element 226 transversely intersects the axis of rotation of the beveling bit 220. This is so as to assure tracking of cut and bevel at the point where the cut, thereby assuring an appropriate depth of cut of the beveling bit and uniform bevel. Moreover, the tracking assembly 223 is preferably mounted in a parallel relationship to the cutting tool assembly 216.

It will be noted that the invention is not limited to the tracking assembly described herein, and other tracking devices may be employed to assure a uniform cut or bevel of a workpiece. Such tracking devices include conventional tracking means using optics, mechanical and electrical sensors, and laser scanning devices.

Figure 17:
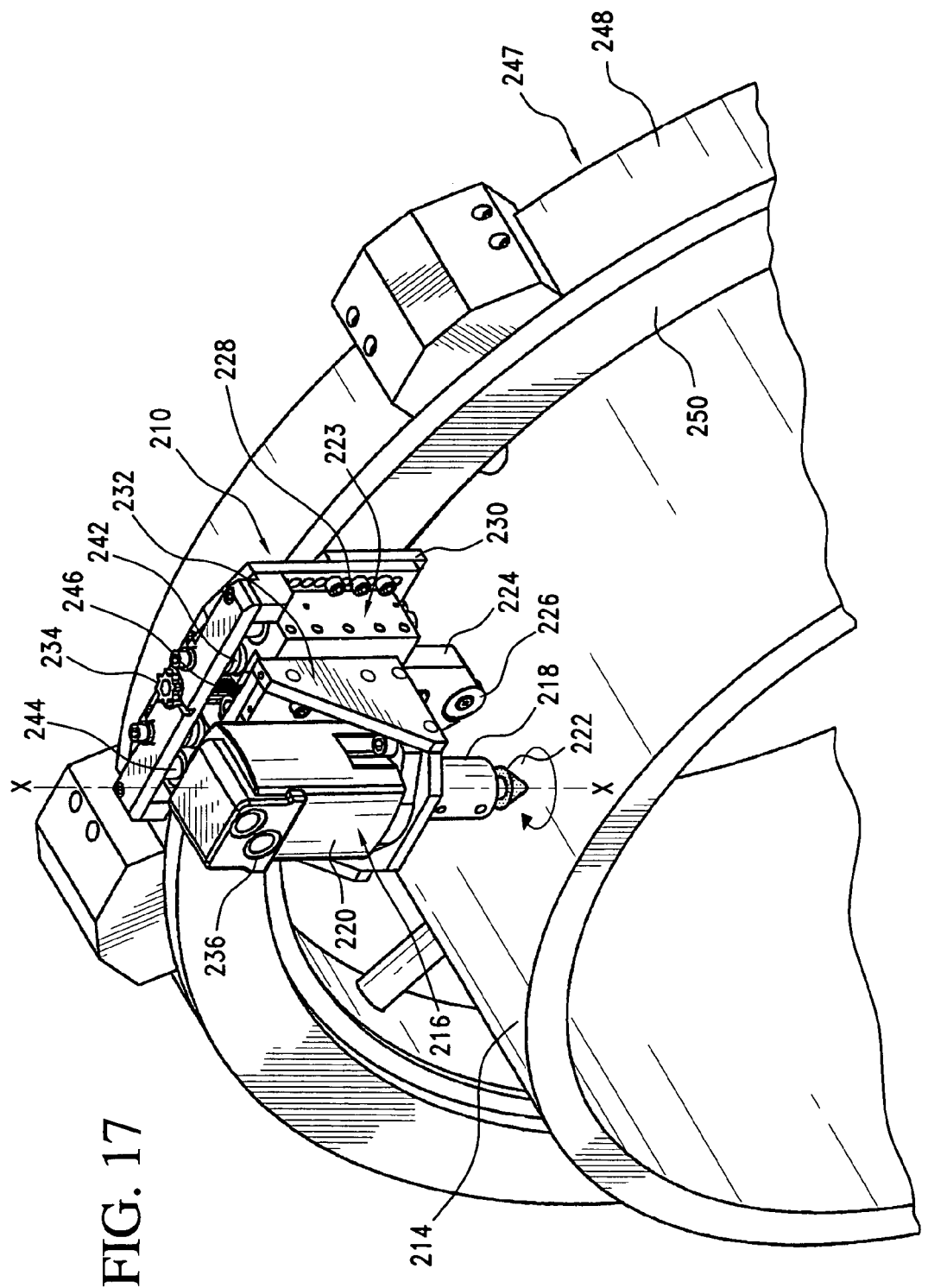
FIG. 17 is a perspective view showing an embodiment of a cutting tool mounted on a split-frame tool carrier supported on a workpiece.
Figure 18:
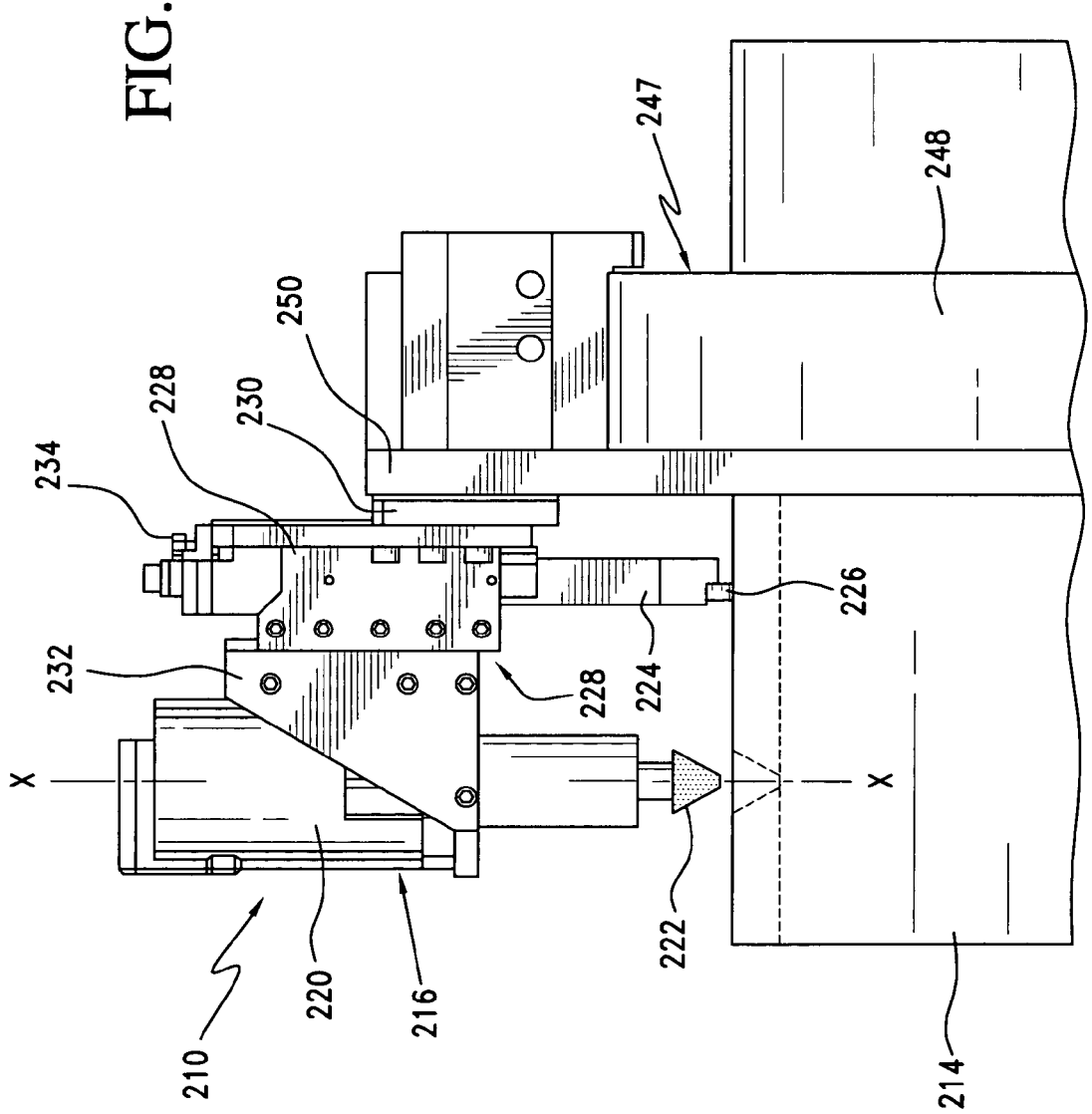
FIG. 18 is a side elevational view showing the cutting tool on a split frame tool carrier of FIG. 17.

FIGS. 17 and 18 show another embodiment according to the invention wherein the cutting tool assembly 220 and tracking assembly 223 are mounted onto a split frame portable machine 247 such as those described in U.S. Pat. No. 4,418,591, granted Dec. 6, 1983, and U.S. Pat. No. 4,665,782. The split frame portable machine 247 has a generally annular workpiece-engaging support housing member 248 and a tool carrier ring member 250 mounted on the end of the tool housing member for rotation relative thereto.

While the cutting tool assembly 216 may be mounted for travel on a split frame portable machine 247 having a rotatable head and a fixed tool body configured to be secured onto a hollow workpiece, such as one illustrated in FIGS. 17 and 18, the cutting tool assembly 216 may be mounted for travel on any other suitable device arranged to clamp onto a workpiece and provide a system for transport of the cutting assembly 216 therabout.

Figure 19:
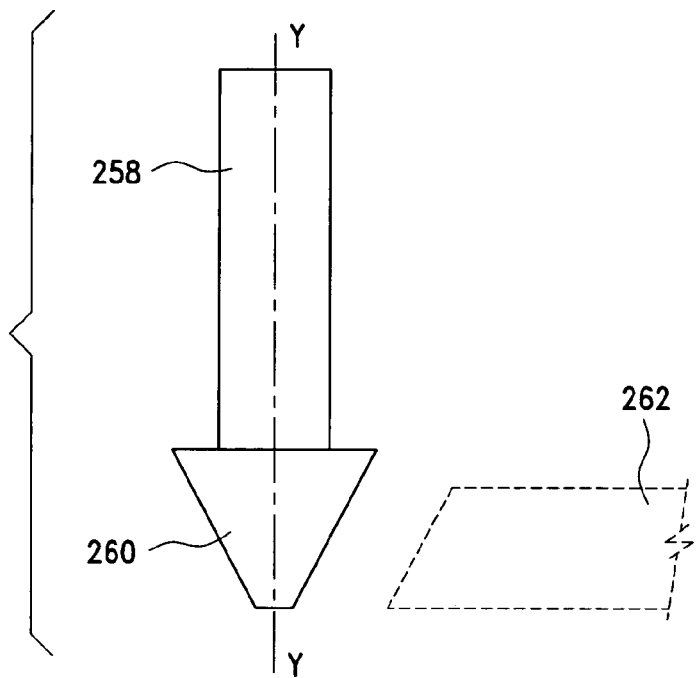
FIG. 19 is an elevational view of an embodiment of a cutting tool.
Figure 20:
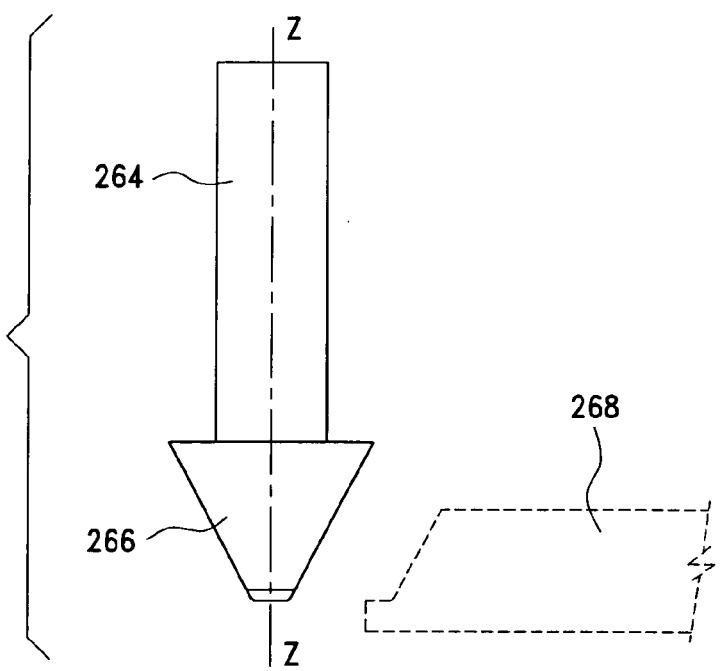
FIG. 20 is an elevational view of an embodiment of a cutting tool.

In accordance with the embodiments shown in FIGS. 14-18, the beveling bit may comprise a variety of forms known to those skilled in the art of beveling pipe or tube ends. One example is a plain bevel beveling bit shown in FIG. 19 that includes a shaft 258 connecting to a beveling head 260 that imparts a profile 262, or in the alternative, a "J-type" beveling bit shown in FIG. 20 that includes a shaft 264 connecting to a beveling head 266 that imparts a profile 268. In addition, other beveling bits may include compound bevels or a "J-type" compound bevel.

Figure 21:
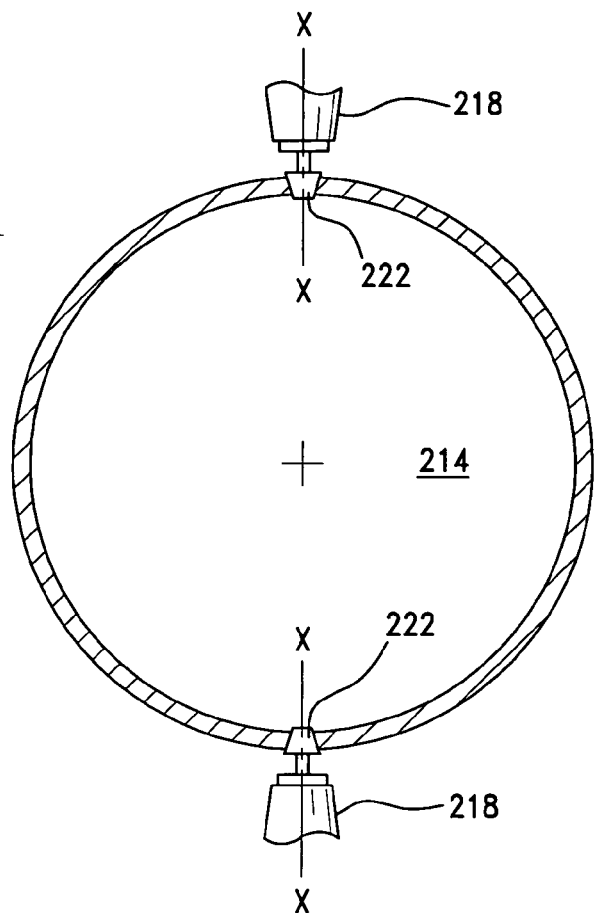
FIGS. 21 and 22 are schematic views illustrating the steps of performing a cutting operation according to a method of the invention.
Figure 22:
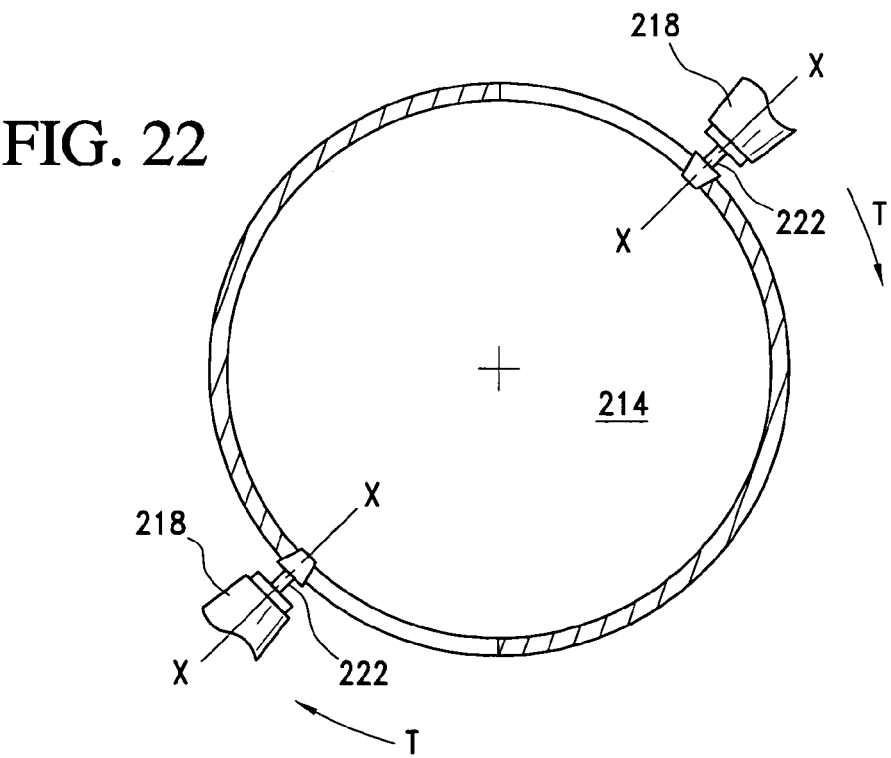

According to a method of the invention exemplified in FIGS. 21 and 22, at least one cutting tool assembly 218 is provided and mounted for travel along a predetermined transport path about at least a portion of a workpiece. For example, two cutting tool assemblies 218 may be rotatably mounted for travel along transport path T orbiting about a central axis of a hollow workpiece 214, such as a pipe or tube.

Each cutting tool assembly 218 includes a rotatably supported beveling bit 222 driven for rotation about a tool longitudinal axis X-X and mounted for travel along the predetermined transport path T transversely of its rotational axis about a central axis of the workpiece in a cutting plane. Upon rotary activation, the end mill 222 of each of the cutting tool assemblies 218 is fed radially through the wall thickness of the workpiece 214 along its rotational axis and the cutting tool assembly 218 is moved along the transport path T as a side portion of the beveling bit 222 cuts through the wall of the workpiece in a single pass along the transport path T.

The method described herein preferably employs the aforesaid tracking assembly to assure a uniform cut and bevel of the workpiece.

Although multiple preferred embodiments of the invention have been described above, it is to be understood that various modifications could be made to the embodiments by any person skilled in the art without departing from the scope of the invention as defined in the claims that follow, and that the various embodiments could be used interchangeably with other embodiments.

We claim:

1. A cutting tool and mounting system, comprising:
   a tool carrier arranged to be mounted onto a workpiece and having at least one flexible track element configured to be attached to a surface of a workpiece;
   a cutting tool assembly carried by the tool carrier, said cutting tool assembly including a cutting tool arranged to be rotated about a longitudinal axis and a tool driving system connected to and arranged to transmit rotary input motion to the cutting tool, the cutting tool being secured by the tool driving system to be fed along its axis of rotation and transversely of its axis of rotation for cutting a workpiece through a wall thickness of the workpiece; and
   at least one tracking assembly connected to the cutting tool assembly and arranged to follow the contour of an outer surface of the workpiece; wherein the tracking assembly comprises:
   a tracking assembly housing including at least two shafts spanning the height thereof;
   a support member having opposed first and second ends, the support member defining a longitudinal slot extending along a longitudinal axis of the support member, and at least two through holes extending along the longitudinal axis of the support member, each of the shafts of the housing extending through a corresponding hole of the support member such that the support member is slidably mounted within the assembly housing;
   a tracking element mounted at the first end of the support member; and
   a plurality of springs biasing the support member against the tracking assembly housing in a direction such that the tracking element is oriented away from the tracking assembly housing.

2. The cutting tool and mounting system according to claim 1, wherein
   the at least one flexible track element includes a track member and a rack member supported along the longitudinal length of the track member and defines a transport path.

3. The cutting tool and mounting system according to claim 2, further comprising:
   a carriage assembly configured to ride along and to be guided by the at least one track element; and
   a carriage drive mechanism arranged to drivingly engage the carriage assembly and to drive the carriage assembly along the at least one track element.

4. The cutting tool and mounting system according to claim 1, wherein the cutting tool is a beveling bit arranged to impart a bevel along an edge of the workpiece.

5. The cutting tool and mounting system according to claim 1, wherein the tracking assembly further comprises:
   a feed mechanism associated with the support member to move the tracking assembly along a path perpendicular to an immediate workpiece surface.

6. The cutting tool and mounting system according to claim 1, wherein the tracking assembly further comprises:
   a retaining member connected to the tracking assembly housing, the retaining member being oriented perpendicular relative to the support member and extending through the longitudinal slot thereof.

7. The cutting tool and mounting system according to claim 1, wherein the tracking element is a wheel.

8. The cutting tool and mounting system according to claim 7, wherein the axis of rotation of the wheel transversely intersects the axis of rotation of the cutting tool.

9. The cutting tool and mounting system according to claim 1, wherein the tracking assembly is mounted in a parallel relationship to the cutting tool assembly.

10. A cutting tool and mounting system, comprising:
    a tool carrier arranged to be mounted onto a workpiece and having at least one flexible track element configured to be attached to a surface of a workpiece; and
    a cutting tool assembly carried by the tool carrier, said cutting tool assembly including a cutting tool arranged to be rotated about a longitudinal axis and a tool driving system connected to and arranged to transmit rotary input motion to the cutting tool, the cutting tool being secured by the tool driving system to be fed along its axis of rotation and transversely of its axis of rotation for cutting a workpiece through a wall thickness of the workpiece, the cutting tool having a beveled profile relative to its axis of rotation; at least one tracking assembly connected to the cutting tool assembly and arranged to follow the contour of an outer surface of the workpiece; wherein the at least one tracking assembly comprises:
    a tracking assembly housing including at least two shafts spanning the height thereof;
    a support member having opposed first and second ends, the support member defining a longitudinal slot extending along a longitudinal axis of the support member, and at least two through holes extending along the longitudinal axis of the support member, each of the shafts of the housing extending through a corresponding hole of the support member such that the support member is slidably mounted within the assembly housing;
    a tracking element mounted at the first end of the support member; and
    a plurality of springs biasing the support member against the tracking assembly housing in a direction such that the tracking element is oriented away from the tracking assembly housing.

11. The cutting tool and mounting system according to claim 10, wherein the tracking element is a wheel.

12. The cutting tool and mounting system according to claim 10, wherein the at least one tracking assembly is mounted in a parallel relationship to the cutting tool assembly.

13. The cutting tool and mounting system according to claim 10, wherein
    the at least one flexible track element includes a track member and a rack member supported along the longitudinal length of the track member and defines a transport path.

* * * * *